United States Patent
Nakamura et al.

(10) Patent No.: US 10,770,943 B2
(45) Date of Patent: Sep. 8, 2020

(54) ROTARY ELECTRIC MACHINE

(71) Applicant: Mitsubishi Electric Corporation, Tokyo (JP)

(72) Inventors: Masashi Nakamura, Tokyo (JP); Shogo Okamoto, Tokyo (JP); Masaya Inoue, Tokyo (JP); Atsushi Sakaue, Tokyo (JP); Tatsuro Hino, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 830 days.

(21) Appl. No.: 14/616,829

(22) Filed: Feb. 9, 2015

(65) Prior Publication Data

US 2016/0065035 A1 Mar. 3, 2016

(30) Foreign Application Priority Data

Aug. 28, 2014 (JP) ................. 2014-173869

(51) Int. Cl.
| | |
|---|---|
| *H02K 9/19* | (2006.01) |
| *H02K 3/24* | (2006.01) |
| *H02K 3/32* | (2006.01) |
| *H02K 3/38* | (2006.01) |
| *H01J 41/12* | (2006.01) |
| *H01F 41/12* | (2006.01) |

(52) U.S. Cl.
CPC ............... *H02K 3/38* (2013.01); *H02K 3/24* (2013.01); *H02K 9/19* (2013.01); *H01F 41/122* (2013.01); *H02K 3/32* (2013.01)

(58) Field of Classification Search
CPC ............. H02K 9/19; H02K 3/24; H02K 3/34
See application file for complete search history.

(56) References Cited

U.S. PATENT DOCUMENTS

| | | | | |
|---|---|---|---|---|
| 4,218,630 A | * | 8/1980 | Watanabe | H02K 3/38 |
| | | | | 310/260 |
| 7,649,296 B2 | * | 1/2010 | Fukasaku | H02K 3/34 |
| | | | | 174/138 E |

(Continued)

FOREIGN PATENT DOCUMENTS

| | | |
|---|---|---|
| JP | 2001-095205 A | 4/2001 |
| JP | 2006-33915 A | 2/2006 |

(Continued)

OTHER PUBLICATIONS

English machine transition of detailed description of Otsubo et al., JP 2014-117034, J-Plat Pat, Jun. 2014.*

(Continued)

*Primary Examiner* — Burton S Mullins
(74) *Attorney, Agent, or Firm* — Sughrue Mion, PLLC; Richard C. Turner

(57) ABSTRACT

A rotary electric machine is installed such that a central axis of a rotating shaft is horizontal, and coolant suction apertures are formed at positions on a cylindrical portion of a frame that are vertically above first and second coil ends, and strip-shaped insulating papers are inserted such that a thickness direction is in a radial direction between radially adjacent conductor portions of portions of the conductor wire that constitute the first and second coil ends, and are disposed so as to extend circumferentially across positions that are vertically below the coolant suction apertures inside the first and second coil ends.

4 Claims, 12 Drawing Sheets

(56) References Cited

U.S. PATENT DOCUMENTS

| | | | | |
|---|---|---|---|---|
| 7,919,890 B2* | 4/2011 | Taketsuna | ............... | H02K 3/24 |
| | | | | 310/254.1 |
| 8,247,934 B2* | 8/2012 | Matsui | ................... | H02K 3/24 |
| | | | | 310/53 |
| 8,269,383 B2* | 9/2012 | Bradfield | ............... | H02K 5/20 |
| | | | | 310/58 |
| 2014/0127055 A1* | 5/2014 | Horiba | ................... | H02K 3/34 |
| | | | | 417/410.5 |

FOREIGN PATENT DOCUMENTS

| JP | 2009-148093 A | 7/2009 |
|---|---|---|
| JP | 2011-35992 A | 2/2011 |
| JP | 5021443 B2 | 9/2012 |
| JP | 2014-117034 A | 6/2014 |

OTHER PUBLICATIONS

Communication dated Jun. 9, 2015 from the Japanese Patent Office in counterpart application No. 2014-173869.

* cited by examiner

ROTARY ELECTRIC MACHINE

BACKGROUND OF THE INVENTION

1. Field of the Invention

The present invention relates to a rotary electric machine such as an electric motor or a generator, for example, and particularly relates to an armature winding cooling construction for a rotary electric machine.

2. Description of the Related Art

In rotary electric machines that are used in electric vehicles, etc., there is demand to be able to pass large currents and continue extended operation at high torque. Since large currents are passed continuously, armature winding temperature increases. Thus, it is important to cool the armature winding effectively such that the armature winding temperature does not exceed a heat tolerance threshold.

In consideration of such conditions, cooling constructions have been proposed in which coil ends of armature windings are cooled directly by a liquid coolant, such as automatic transmission fluid (ATF) oil, for example, during operation (see Patent Literature 1 and 2, for example).

CITATION LIST

Patent Literature

Patent Literature 1: Japanese Patent No. 5021443 (Gazette)
Patent Literature 2: Japanese Patent Laid-Open No. 2001-095205 (Gazette)

SUMMARY OF THE INVENTION

In Patent Literature 1, an electric power distributing portion that is supported by a resin holder, and that has conductors that are connected to an armature winding, is disposed above coil ends of the armature winding. Thirteen coolant outlets are formed on a case radially outside upper halves of coil ends so as to be distributed circumferentially. The rotary electric machine is disposed such that a shaft is horizontal, and a liquid coolant is sprayed onto the coil ends from the coolant outlets to cool the coil ends. A portion of the liquid coolant that is blown onto the coil ends flows radially inside the coil ends, and remaining liquid coolant flows circumferentially through gaps that are formed between an end surface of the armature core and a lower surface of a wiring portion, effectively cooling the armature winding. However, because it is necessary to form thirteen coolant outlets on the case radially outside the upper half of the coil ends so as to be distributed circumferentially, one problem has been that the cooling construction is complicated. In addition, because the electric power distributing portion is disposed above the coil end portions of the armature winding, another problem has been that axial dimensions of the rotary electric machine are increased, preventing downsizing of the rotary electric machine.

In Patent Literature 2, a central bore is disposed at a central axial position of a shaft, and penetrating apertures are formed so as to branch off radially from the central bore at positions on the shaft near coil ends. A liquid coolant is supplied to the central bore, is sprayed from the penetrating apertures due to centrifugal forces, and is blown onto the coil ends. However, because the liquid coolant is blown onto the coil ends from a direction that is inclined forward in the direction of rotation of the shaft relative to a radial direction, one problem has been that the liquid coolant is less likely to pass through the coil ends and reach the radially outer side, giving rise to uneven cooling in the coil ends, and making cooling of the armature winding poor.

The present invention aims to solve the above problems and an object of the present invention is to provide a rotary electric machine that can cool an armature winding effectively, that suppresses increases in axial dimensions, and that enables downsizing, by disposing a strip-shaped insulating paper so as to be inserted between conductor portions that are adjacent to each other in a radial direction of a coil end of the armature winding and extend circumferentially to make a liquid coolant that is supplied to the coil ends from vertically above flow circumferentially and be kept from flowing out radially inward by the insulating paper.

In order to achieve the above object, according to one aspect of the present invention, there is provided a rotary electric machine including: a housing; a rotor that is fixed to a rotating shaft that is rotatably supported by the housing so as to be disposed inside the housing; an armature including: an annular armature core in which slots are arranged circumferentially so as to open radially inward; and an armature winding that is constituted by a plurality of coils that are each produced by bending and shaping a conductor wire, and that are mounted to the armature core, the armature being disposed so as to be coaxial to the rotor so as to surround the rotor, and being held by the housing, the rotary electric machine being installed such that a central axis of the rotating shaft is horizontal, and a liquid coolant being blown onto a coil end of the armature winding from a coolant suction aperture that is formed on the housing to cool the armature winding. The coolant suction aperture is formed at a position on the housing that is vertically above the coil end, and a strip-shaped insulating paper is inserted such that a thickness direction is in a radial direction between radially adjacent conductor portions of a portion of the conductor wire that constitutes the coil end, and is disposed so as to extend circumferentially across a position that is vertically below the coolant suction aperture inside the coil end.

According to the present invention, a strip-shaped insulating paper is inserted such that a thickness direction is in a radial direction between radially adjacent conductor portions of a portion of a conductor wire that constitutes a coil end, and is disposed so as to extend circumferentially across a position that is vertically below a coolant suction aperture inside the coil end. Thus, liquid coolant that is blown onto the coil end, contacts the insulating paper, is kept from flowing out to an radially inner side of the coil end, and flows through the coil end circumferentially. Thus, the liquid coolant spreads around evenly circumferentially inside the coil end, eliminating uneven cooling of the coil end, and enabling the armature winding to be cooled effectively. Furthermore, the number of coolant suction apertures that are formed radially outside the coil ends need only be one, enabling the cooling construction of the armature winding to be simplified. In addition, because it is not necessary to dispose an electrically insulating holder above the coil end of the armature winding, increases in axial dimensions of the rotary electric machine are suppressed, enabling downsizing of the rotary electric machine to be achieved.

DETAILED DESCRIPTION OF THE PREFERRED EMBODIMENTS

A preferred embodiment of a rotary electric machine according to the present invention will now be explained with reference to the drawings.

Embodiment 1

Figure 1:
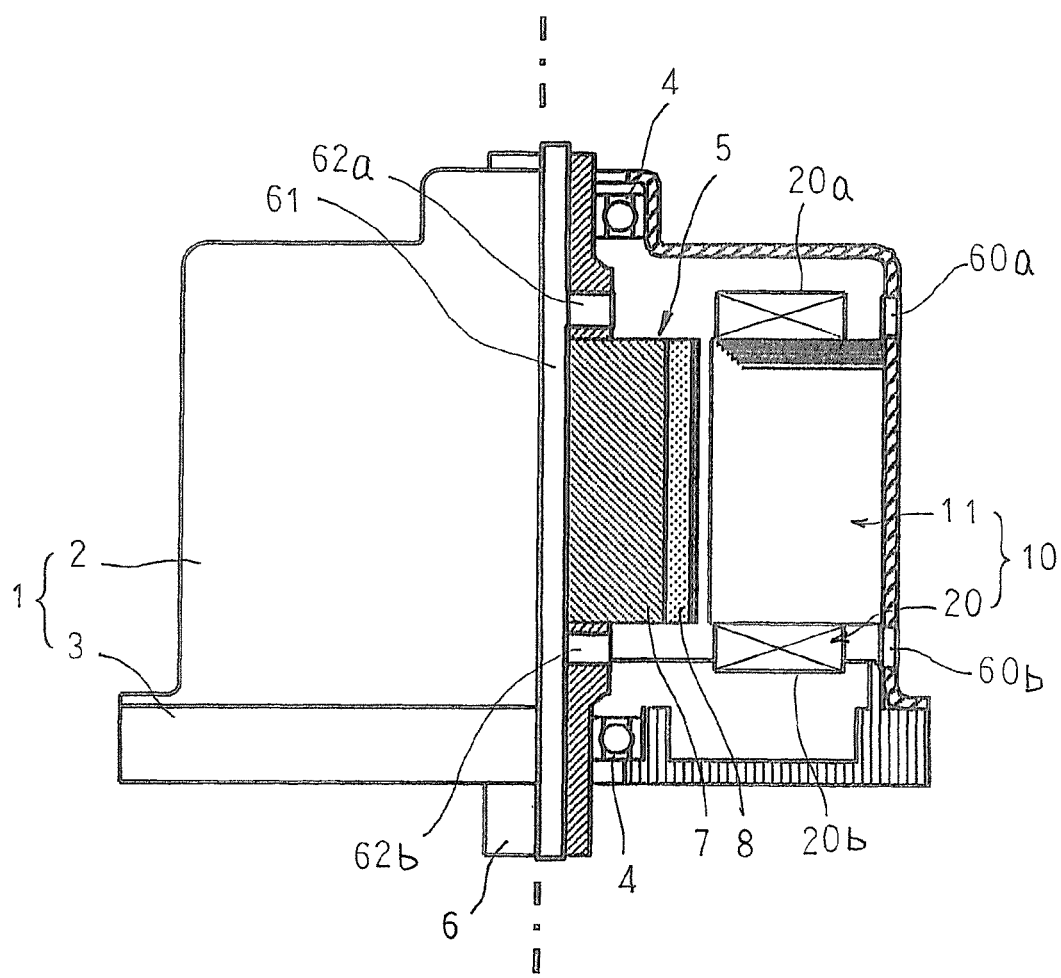
FIG. 1 is a half section that shows a rotary electric machine according to Embodiment 1 of the present invention.
Figure 2:
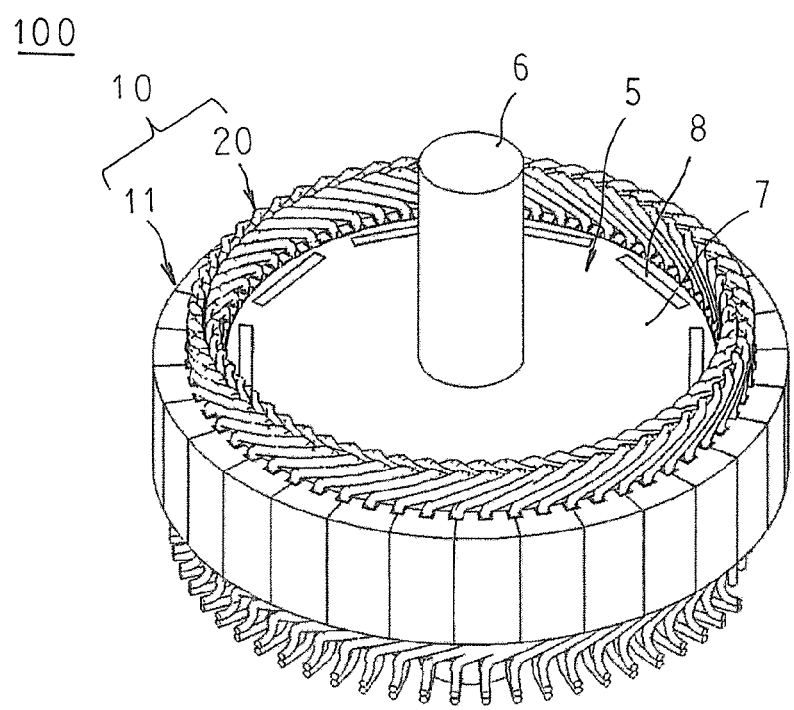
FIG. 2 is an oblique projection that shows part of the rotary electric machine according to Embodiment 1 of the present invention.
Figure 3:
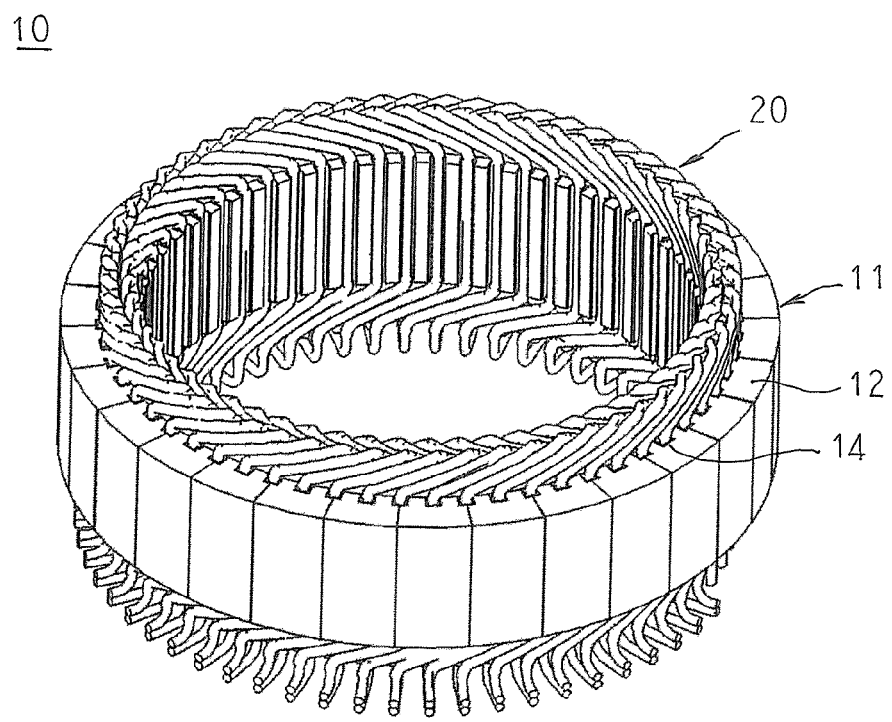
FIG. 3 is an oblique projection that shows an armature that is used in the rotary electric machine according to Embodiment 1 of the present invention.
Figure 4:
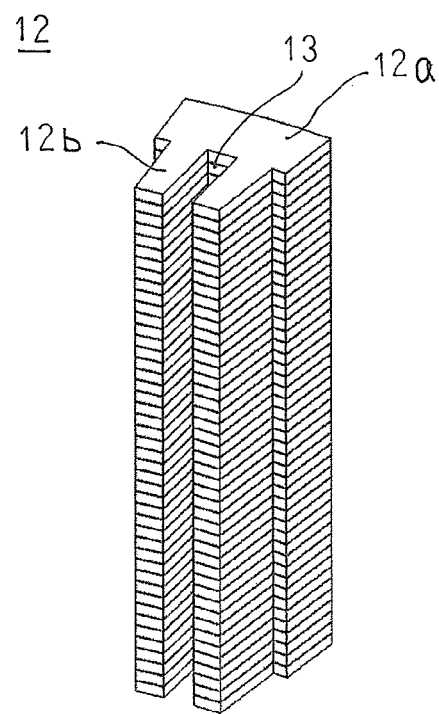
FIG. 4 is an oblique projection that shows a core block that constitutes the armature that is used in the rotary electric machine according to Embodiment 1 of the present invention.
Figure 5:
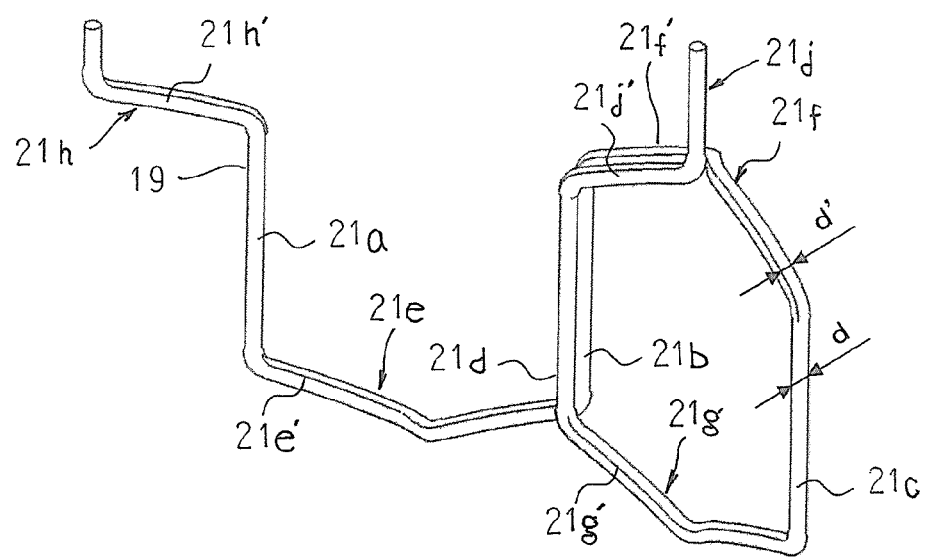
FIG. 5 is an oblique projection that shows a coil that constitutes an armature winding in the rotary electric machine according to Embodiment 1 of the present invention.
Figure 6:
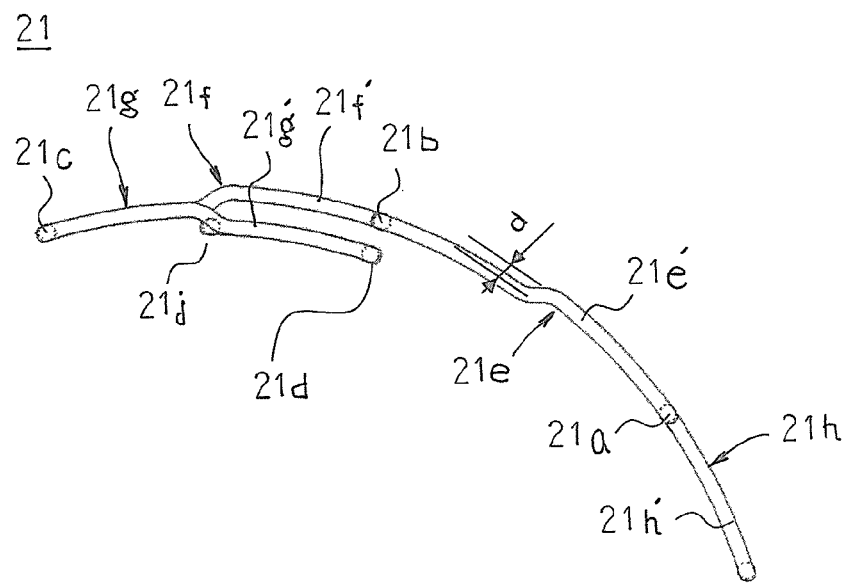
FIG. 6 is an end elevation that shows the coil that constitutes the armature winding in the rotary electric machine according to Embodiment 1 of the present invention.
Figure 7:
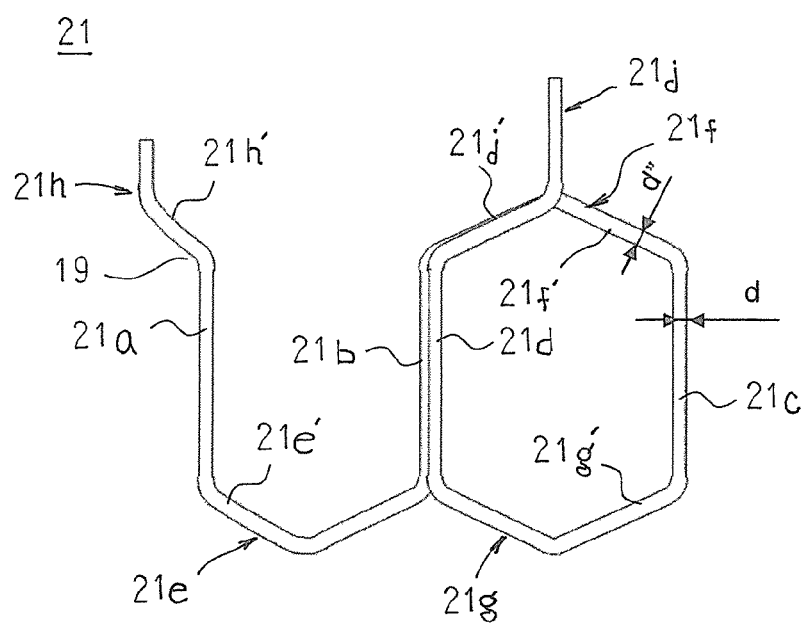
FIG. 7 is a front elevation that shows the coil that constitutes the armature winding in the rotary electric machine according to Embodiment 1 of the present invention.
Figure 8:
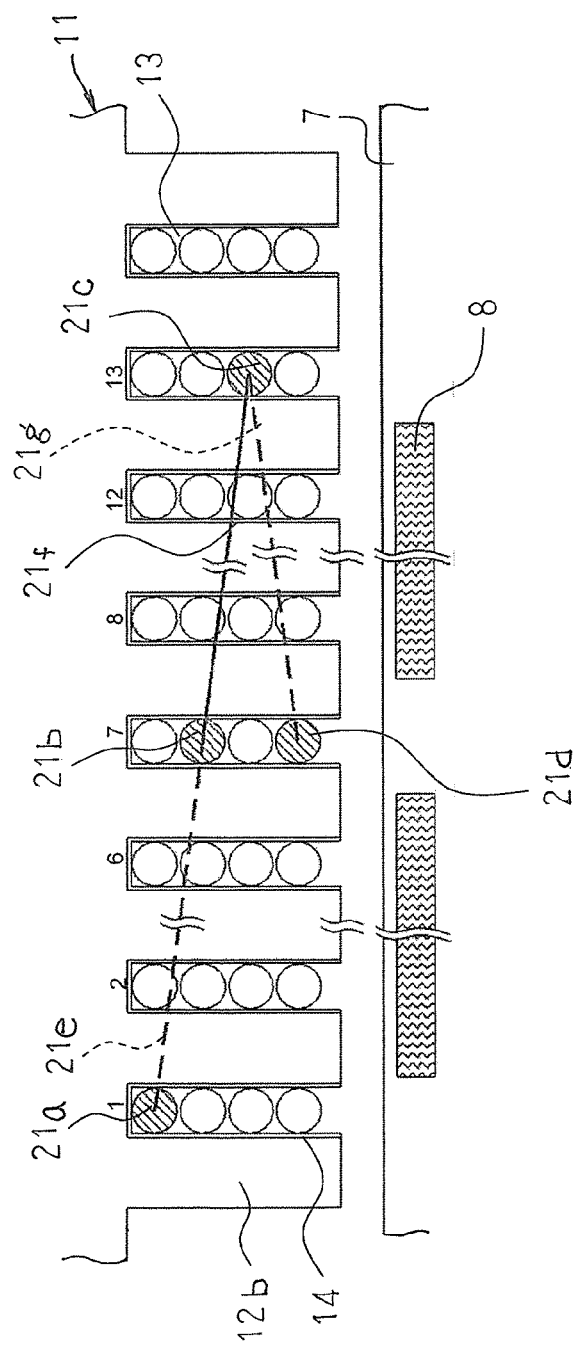
FIG. 8 is a cross-sectional schematic diagram that explains arrangement of the coils that constitute the armature winding that is used in the rotary electric machine according to Embodiment 1 of the present invention.
Figure 9:
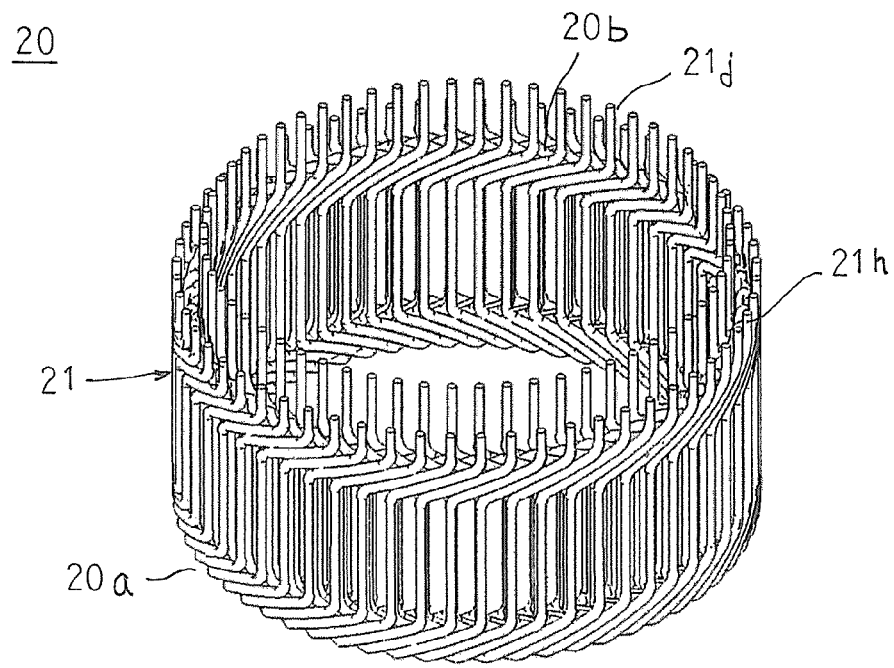
FIG. 9 is an oblique projection that shows an armature winding that is used in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes the armature that is used in the rotary electric machine according to Embodiment 1 of the present invention, FIG. 5 is an oblique projection that shows a coil that constitutes an armature winding in the rotary electric machine according to Embodiment 1 of the present invention, FIG. 6 is an end elevation that shows the coil that constitutes the armature winding in the rotary electric machine according to Embodiment 1 of the present invention, FIG. 7 is a front elevation that shows the coil that constitutes the armature winding in the rotary electric machine according to Embodiment 1 of the present invention, FIG. 8 is a cross-sectional schematic diagram that explains arrangement of the coils that constitute the armature winding that is used in the rotary electric machine according to Embodiment 1 of the present invention, and FIG. 9 is an oblique projection that shows an armature winding that is used in the rotary electric machine according to Embodiment 1 of the present invention. Moreover, for simplicity, first through third coil end portions are represented using straight lines in FIG. 8.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

Coolant suction apertures 60a and 60b for supplying a liquid coolant are formed individually on the cylindrical portion of the frame 2 so as to be positioned radially outside respective coil ends of an armature winding 20 that protrude axially outward from two axial ends of an armature core 11. A central bore 61 from which the liquid coolant is supplied is formed so as to pass axially through a central axial position of the rotating shaft 6. In addition, nozzles 62a and 62b that branch radially from the central bore 61 are formed on the rotating shaft 6 so as to be positioned radially inside the respective coil ends of the armature winding 20.

The rotor 5 is a permanent-magnet rotor that includes: a rotor core 7 that is fixed to the rotating shaft 6, which is inserted through a central axial position thereof; and permanent magnets 8 that are embedded near an outer circumferential surface of the rotor core 7 so as to be arranged at a constant pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: the armature core 11; the armature winding 20 that is mounted onto the armature core 11; and slot cells 44 that electrically isolate the armature core 11 and the armature winding 20. Here, to facilitate explanation, the number of poles in the rotor 5 is ten, the number of slots in the armature core 11 is sixty, and the armature winding 20 is a three-phase winding. In other words, the slots 13 are formed on the armature core 11 at a ratio of two slots per phase per pole.

As shown in FIG. 4, core blocks 12 are made by dividing the annular armature core 11 into thirty equal sections circumferentially, and include: a core back portion 12a that has a circular arc-shaped cross section, that is produced by laminating and integrating a large number of electromagnetic steel sheets; and two teeth 12b that are disposed so as to protrude radially inward from an inner circumferential wall surface of the core back portion 12a.

The armature core 11 is configured into an annular shape by arranging and integrating thirty core blocks 12 circumferentially by butting together circumferential side surfaces of the core back portions 12a such that the teeth 12b are oriented radially inward. Slots 13 that are formed by the core back portions 12a and two circumferentially adjacent teeth 12b are arranged at a uniform angular pitch circumferentially so as to be open on an inner circumferential side. Moreover, the teeth 12b are formed so as to have a tapered shape in which a circumferential width becomes gradually narrower radially inward, and a cross section of the slots 13 is rectangular.

The slot cells 14 are formed into U shapes by bending and shaping rectangular sheets that are produced by sandwiching a polyimide film between meta-aramid fibers, for example, and are inserted into the slots 13 to isolate the armature core 11 and the armature winding 20 electrically.

The armature winding 20 is constituted by a plurality of coils 21. A coil 21 is produced by winding a conductor wire 19 that has a circular cross section that has a diameter d, that is made of jointless continuous copper wire or aluminum wire that is coated with an insulating enamel resin, for example, into a δ-shaped coil pattern. Moreover, the coil 21 may be produced by winding the conductor wire 19 that has a rectangular cross section into the δ-shaped coil pattern.

As shown in FIGS. 5 through 7, the coils 21 include: first, second, third, and fourth rectilinear portions 21a, 21b, 21c, and 21d that form three rows so as to be at an angular pitch of six slots apart; a first coil end portion 21e that links first longitudinal ends of the first and second rectilinear portions 21a and 21b to each other; a second coil end portion 21f that links second longitudinal ends of the second and third rectilinear portions 21b and 21c to each other; a third coil end portion 21g that links first longitudinal ends of the third and fourth rectilinear portions 21c and 21d to each other; a first coil terminal 21h that extends from a second longitudinal end of the first rectilinear portion 21a; and a second coil terminal 21j that extends from a second longitudinal end of the fourth rectilinear portion 21d. The first and second coil terminals 21h and 21j are connected to other coils 21, to electric power supplying portions, and to a neutral point. Moreover, an angular pitch of six slots is a pitch between slot centers of slots 13 on two sides of six circumferentially consecutive teeth 12b, and corresponds to a pitch of one magnetic pole.

Specifically, as shown in FIG. 8, the winding bodies 21 are produced into a δ-shaped coil pattern in which the conductor wire 19 is inserted into a first layer inside the slots 13 at Slot Number 1 from near a first axial end of the armature core 11, extends outward from the slots 13 at Slot Number 1 at a second axial end of the armature core 11, is inserted into a second layer inside the slots 13 at Slot Number 7, which is separated by an angular pitch of six slots in a first circumferential direction, extends outward from the slots 13 at Slot Number 7 at a second axial end of the armature core 11, is inserted into a third layer inside the slots 13 at Slot Number 13, which is separated by an angular pitch of six slots in the first circumferential direction, extends outward from the slots 13 at Slot Number 13 at the second axial end of the armature core 11, is inserted into a fourth layer inside the slots 13 at Slot Number 7, which is separated by an angular pitch of six slots in the second circumferential direction, and extends outward from the slots 13 at Slot Number 7 at the first axial end of the armature core 11. The coils 21 that are produced in this manner are distributed-winding coils.

Moreover, for simplicity, housed positions of the conductor wire that is housed inside the slots 13 are designated a first layer, a second layer, a third layer, and a fourth layer from radially outside in FIG. 8. In FIG. 8, 1, 2, etc., through 13 are slot numbers that are allotted to the slots 13 sequentially in a circumferential direction.

Here, the first coil end portion 21e that extends outward at the first axial end of the armature core 11 from the first layer inside the slots 13 at Slot Number 1 maintains its radial position and extends at a constant inclination in the first circumferential direction and axially outward, is displaced by d radially inward at a crank portion of a central portion (the top portion), and subsequently maintains its radial position and extends at a reverse inclination in the first circumferential direction and axially inward to enter the second layer inside the slots 13 at Slot Number 7.

The second coil end portion 21f that extends outward at the second axial end of the armature core 11 from the second layer inside the slots 13 at Slot Number 7 maintains its radial position and extends at a constant inclination in the first circumferential direction and axially outward, is displaced by d radially inward at a crank portion of a central portion (the top portion), and subsequently maintains its radial position and extends at a reverse inclination in the first circumferential direction and axially inward to enter the third layer inside the slots 13 at Slot Number 13.

The third coil end portion 21g that extends outward at the first axial end of the armature core 11 from the third layer inside the slots 13 at Slot Number 13 maintains its radial position and extends at a constant inclination in the second circumferential direction and axially outward, is displaced by d radially inward at a crank portion of a central portion (the top portion), and subsequently maintains its radial position and extends at a reverse inclination in the second circumferential direction and axially inward to enter the fourth layer inside the slots 13 at Slot Number 7.

The first coil terminal 21h that extends from the first layer inside the slots 13 at Slot Number 1 at the second axial end of the armature core 11 maintains its radial position, extends in the second circumferential direction and axially outward at a constant inclination, and is subsequently bent to project radially outward.

The second coil terminal 21j that extends from the fourth layer inside the slots 13 at Slot Number 7 at the second axial end of the armature core 11 maintains its radial position, extends in the first circumferential direction and axially outward at a constant inclination, and is subsequently bent to project radially outward.

Thus, the first through third coil end portions 21e, 21f, and 21g have: pairs of inclined portions 21e', 21f', and 21g'; and crank portions that displace radially by the radial width d of the conductor wires. The first and second coil terminals 21h and 21j have inclined portions 21h' and 21j'. The first through fourth rectilinear portions 21a, 21b, 21c, and 21d are formed so as to have circular cross sections of diameter d. The first through third coil end portions 21e, 21f, and 21g and the first and second coil terminals 21h and 21j are deformed by applying pressure to conductor wire that has a circular cross section from two radial sides using parallel flat plates, for example, so as to have flat cross sections that have a radial thickness d', where d'<d, and an axial thickness d", where d">d.

Sixty coils 21 that are produced in this manner are arranged into an annular shape circumferentially at a pitch of one slot to assemble the armature winding 20, as shown in FIG. 9. At a first axial end of this armature winding 20, a first coil end portion row that is configured by arranging the first coil end portions 21e at a pitch of one slot circumferentially and a third coil end portion row that is configured by arranging the third coil end portions 21g at a pitch of one slot circumferentially are lined up in two layers in a radial direction to constitute a first coil end 20a. At a second axial end of this armature winding 20, a second coil end portion row that is configured by arranging the second coil end portions 21f at a pitch of one slot circumferentially constitutes a second coil end 20b. In addition, end portions of the first coil terminals 21h that extend axially outward are arranged at a pitch of one slot circumferentially around a radially outer side of the second coil ends 20b. Furthermore, end portions of the second coil terminals 21j that extend axially outward are arranged at a pitch of one slot circumferentially around a radially inner side of the second coil ends 20b.

Figure 10:
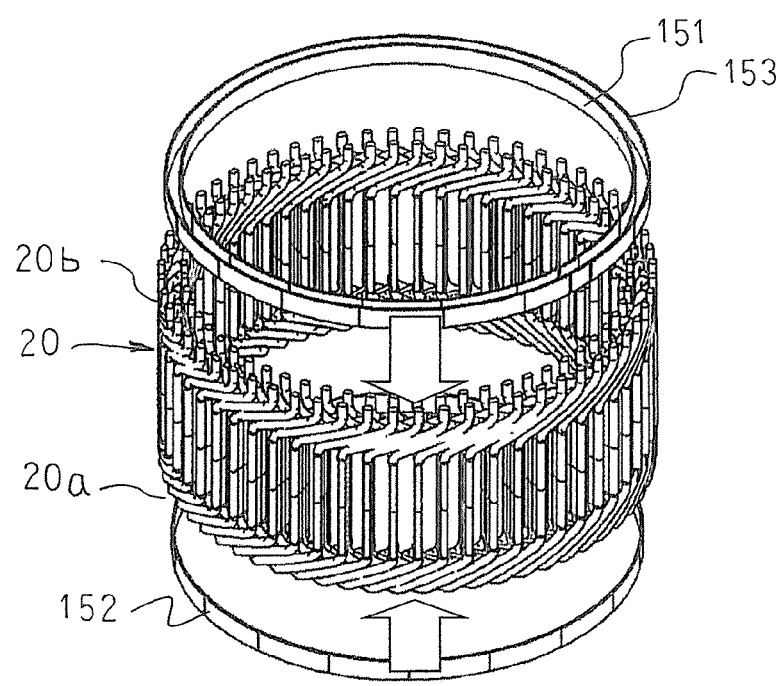
FIG. 10 is an oblique projection that explains a method for mounting insulating papers to the armature winding in the rotary electric machine according to Embodiment 1 of the present invention.
Figure 11:
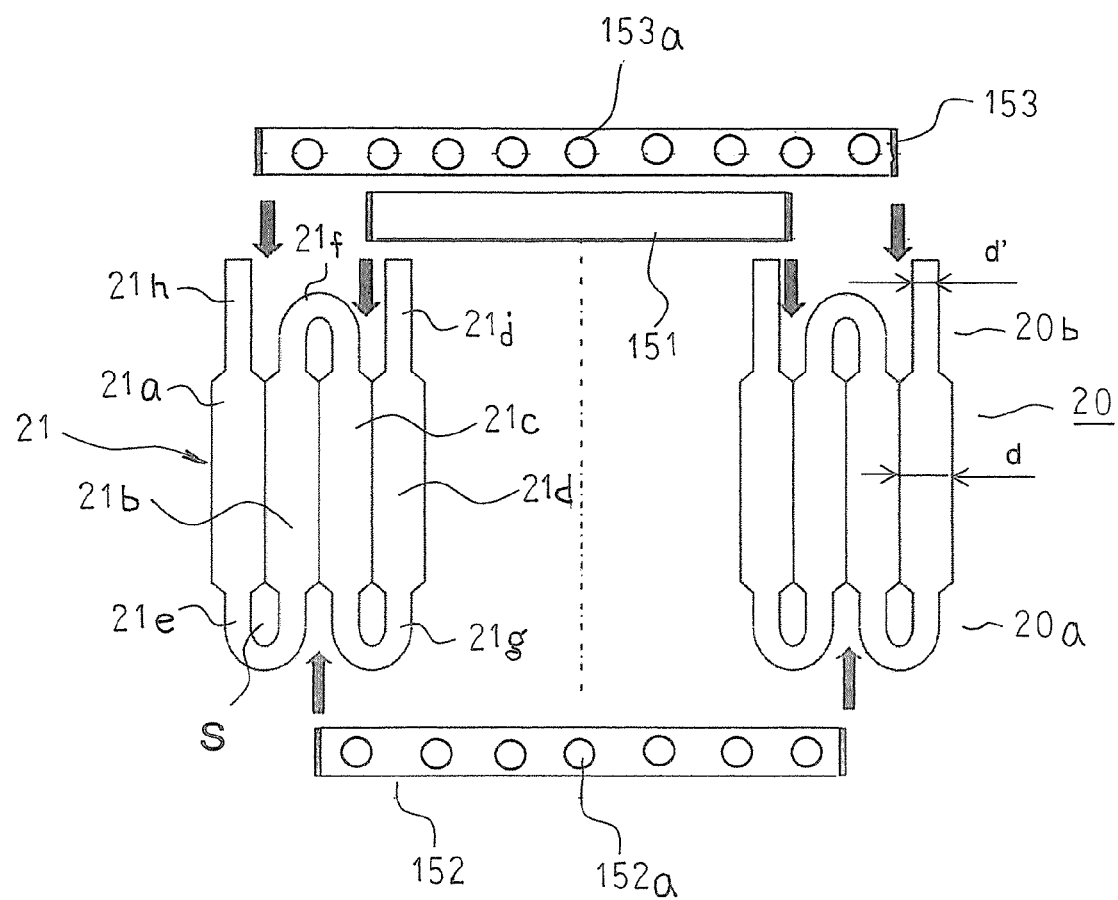
FIG. 11 is a schematic cross section that explains the method for mounting insulating papers to the armature winding in the rotary electric machine according to Embodiment 1 of the present invention.
Figure 12:
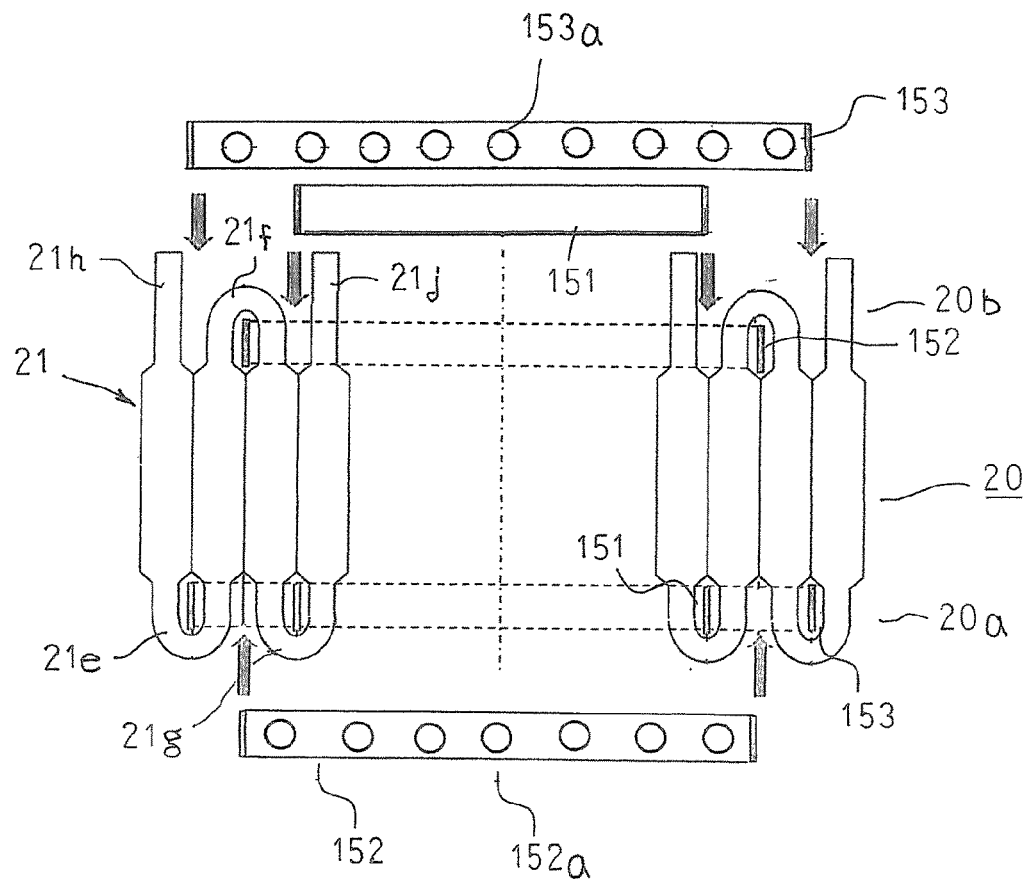
FIG. 12 is a schematic cross section that explains the method for mounting insulating papers to the armature winding in the rotary electric machine according to Embodiment 1 of the present invention.
Figure 13:
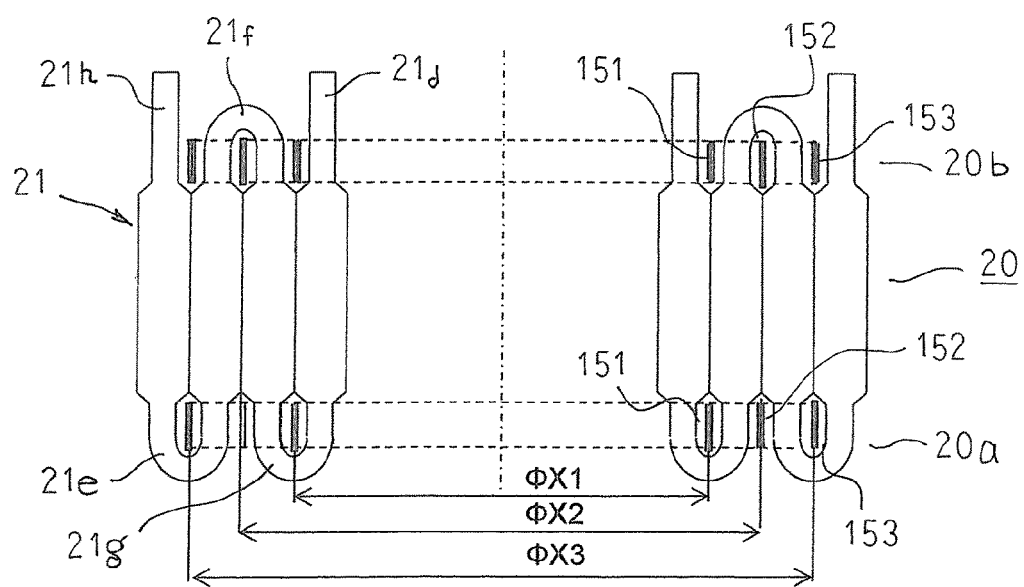
FIG. 13 is a schematic cross section that shows a mounted state of the insulating papers of the armature winding in the rotary electric machine according to Embodiment 1 of the present invention.
Figure 14:
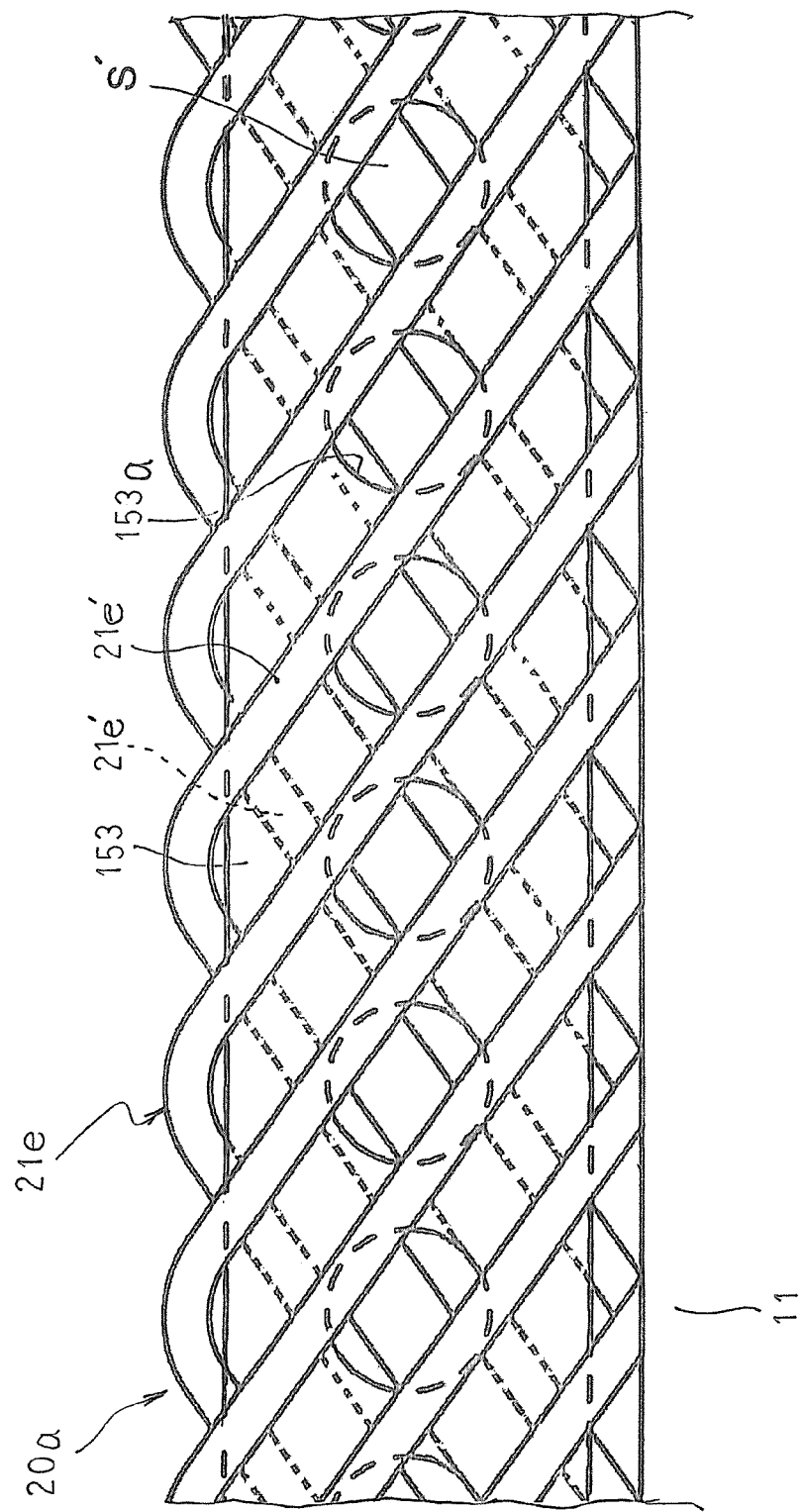
FIG. 14 is a partial enlargement in which a mounted state of insulating papers in first coil ends of the armature winding in the rotary electric machine according to Embodiment 1 of the present invention is viewed from radially outside.
Figure 15:
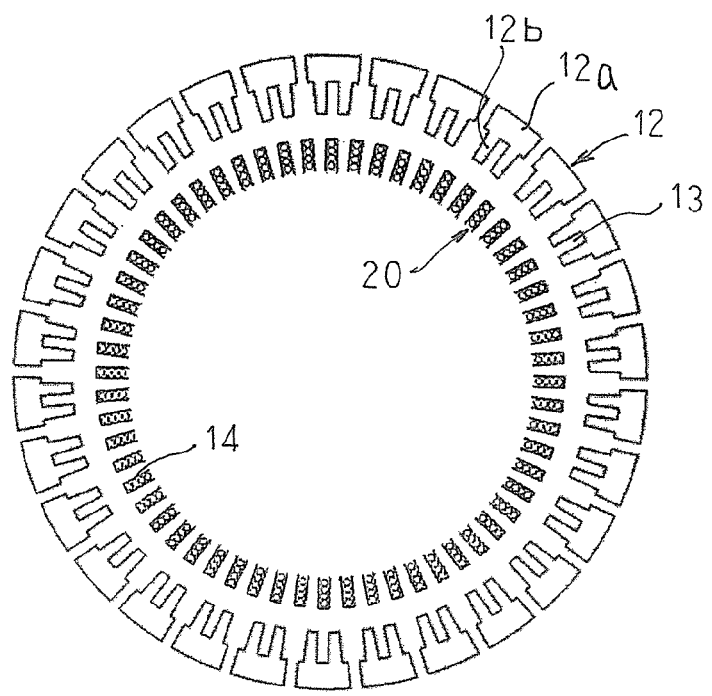
FIG. 15 is a diagram that explains a method for assembling the armature in the rotary electric machine according to Embodiment 1 of the present invention.
Figure 16:
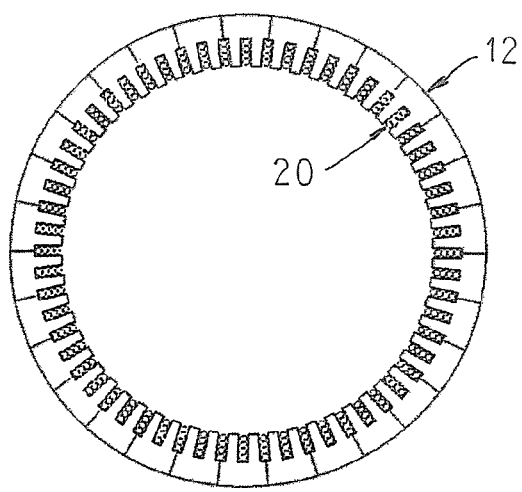
FIG. 16 is a diagram that explains the method for assembling the armature in the rotary electric machine according to Embodiment 1 of the present invention.

Next, a method for assembling the armature 10 will be explained with reference to FIGS. 10 through 16. FIG. 10 is an oblique projection that explains a method for mounting insulating papers to the armature winding in the rotary electric machine according to Embodiment 1 of the present invention, FIGS. 11 and 12 are schematic cross sections that explain the method for mounting insulating papers to the armature winding in the rotary electric machine according to Embodiment 1 of the present invention, FIG. 13 is a schematic cross section that shows a mounted state of the insulating papers of the armature winding in the rotary electric machine according to Embodiment 1 of the present invention, FIG. 14 is a partial enlargement in which a mounted state of insulating papers in first coil ends of the armature winding in the rotary electric machine according to Embodiment 1 of the present invention is viewed from radially outside, and FIGS. 15 and 16 are diagrams that explain a method for assembling the armature in the rotary electric machine according to Embodiment 1 of the present invention. Moreover, for simplicity, only the first through fourth rectilinear portions of the armature winding are shown in FIGS. 15 and 16.

First, in the armature winding 20, the conductor wire 19 that has a circular cross section that has the diameter d is deformed such that the first through third coil end portions 21e, 21f, and 21g and the first and second coil terminals 21h and 21j have flat cross sections that have a radial thickness d', where d'<d, and an axial thickness d'; where d">d. Thus, as shown in FIG. 11, respective gaps S (=d−d') are formed inside the first through third coil end portions 21e, 21f, and 21g.

Then, as shown in FIGS. 10 and 11, a second insulating paper 152 that is produced so as to have an annular shape is mounted to the armature winding 20 from a side near the first coil ends 20a, and first and third insulating papers 151 and 153 that are produced so as to have an annular shape are mounted to the armature winding 20 from a side near the second coil ends 20b. Then, as shown in FIG. 12, the first insulating paper 151 is moved so as to pass between the third rectilinear portions 21c and the fourth rectilinear portions 21d toward the first coil ends 20a, and is inserted into the gap S inside the first coil end portions 21e. The second insulating paper 152 is moved so as to pass between the second rectilinear portions 21b and the third rectilinear portions 21c toward the second coil ends 20b, and is inserted into the gap S inside the second coil end portions 21f. In addition, the third insulating paper 153 is moved so as to pass between the first rectilinear portions 21a and the second rectilinear portions 21b toward the first coil ends 20a, and is inserted into the gap S inside the third coil end portions 21g.

Next, as shown in FIGS. 12 and 13, a first insulating paper 151 and a third insulating paper 153 are inserted into a gap between the second coil terminals 21j and the second coil end portions 21f and into a gap between the first coil terminals 21h and the second coil end portions 21f from the side near the second coil ends 20b. A second insulating paper 152 is also inserted into a gap between the first coil end portions 21e and the third coil end portions 21g from the side near the first coil ends 20a.

The first insulating papers 151 are configured into an annular shape by curling an insulating paper that is formed so as to have a long strip-shaped body. The second insulating papers 152 are configured into an annular shape by curling an insulating paper that is formed so as to have a long strip-shaped body. A plurality of circular penetrating apertures 152a are each formed in a circumferential direction so as to pass through the second insulating paper 152 in a thickness direction. The third insulating papers 153 are configured into an annular shape by curling an insulating paper that is formed so as to have a long strip-shaped body. A plurality of circular penetrating apertures 153a are each formed in a circumferential direction so as to pass through the third insulating paper 153 in a thickness direction.

As shown in FIG. 13, $\Phi x1 < \Phi x2 < \Phi x3$, where $\Phi x1$ is a diameter of the first insulating paper 151 when inserted into the gap S inside the first coil end portions 21e, $\Phi x2$ is a diameter of the second insulating paper 152 when inserted into the gap S inside the second coil end portions 21f, and $\Phi x3$ is a diameter of the third insulating paper 153 when inserted into the gap S inside the third coil end portions 21g. The first through third insulating papers 151, 152, and 153 are produced using an insulating material that is made of a polyimide, an aramid, polyethylene terephthalate (PET), or polyphenylene sulfide (PPS), for example.

Now, focusing on the first coil ends 20a, as shown in FIG. 14, the inclined portions 21e' of the first coil end portions 21e that protrude outward from the first layer of the slots 13 to the top portions and the inclined portions 21e' of the first coil end portions 21e that protrude outward from the second layer of the slots 13 to the top portions are arranged at a pitch of one slot in a circumferential direction so as to be inclined in opposite directions to constitute a first coil end portion row. Thus, if the first coil end portion row is viewed from a radially outer side, a gap S' is formed between radially adjacent inclined portions 21e' of the first coil end portion row. The third insulating paper 153 is disposed inside the first coil end portion row such that the penetrating apertures 153$a$ overlap with the gap S' when viewed from the radially outer side. Moreover, the radially adjacent inclined portions 21$e$' of the first coil end portion row correspond to radially adjacent conductor portions of portions of the conductor wires 19 that constitute the first coil ends 20$a$.

Although not shown, the inclined portions 21$e$' of the first coil end portions 21$e$ that protrude outward from the second layer of the slots 13 to the top portions and the inclined portions 21$g$' of the third coil end portions 21$g$ that protrude outward from the third layer of the slots 13 to the top portions are arranged at a pitch of one slot in a circumferential direction so as to be inclined in opposite directions. Thus, if viewed radially inward from the first coil end portions, a gap S' is formed between radially adjacent inclined portions 21$e$' and 21$g$' of the first coil end portion row and the third coil end portion row. The second insulating paper 152 is disposed between the first coil end portion row and the third coil end portion row such that the penetrating apertures 152$a$ overlap with the gap S' when viewed from the radially outer side. Moreover, the radially adjacent inclined portions 21$e$' and 21$g$' of the first coil end portion row and the third coil end portion row correspond to radially adjacent conductor portions of portions of the conductor wires 19 that constitute the first coil ends 20$a$.

Although not shown, the inclined portions 21$g$' of the third coil end portions 21$g$ that protrude outward from the third layer of the slots 13 to the top portions and the inclined portions 21$g$' of the third coil end portions 21$g$ that protrude outward from the fourth layer of the slots 13 to the top portions are arranged at a pitch of one slot in a circumferential direction so as to be inclined in opposite directions to constitute a third coil end portion row. The first insulating paper 151 is disposed between radially adjacent inclined portions 21$g$' of the third coil end portion row. Moreover, the radially adjacent inclined portions 21$g$' of the third coil end portion row correspond to radially adjacent conductor portions of portions of the conductor wires 19 that constitute the first coil ends 20$a$.

Focusing on the second coil ends 20$b$, the inclined portions 21$h$' of the first coil terminals 21$h$ that protrude outward from the first layer of the slots 13 to the end portions and the inclined portions 21$f$' of the second coil end portions 21$f$ that protrude outward from the second layer of the slots 13 to the top portions are arranged at a pitch of one slot in a circumferential direction so as to be inclined in opposite directions. Thus, if viewed from a radially outer side, a gap S' is formed between radially adjacent inclined portions 21$h$' and 21$f$' of the row of first coil terminals 21$h$ and the second coil end portion row. The third insulating paper 153 is disposed between the row of first coil terminals 21$h$ and the second coil end portion row such that the penetrating apertures 153$a$ overlap with the gap S' when viewed from the radially outer side. Moreover, the radially adjacent inclined portions 21$h$' and 21$f$' of the row of first coil terminals 21$h$ and the second coil end portion row correspond to radially adjacent conductor portions of portions of the conductor wires 19 that constitute the second coil ends 20$b$.

Although not shown, the inclined portions 21$f$' of the second coil end portions 21$f$ that protrude outward from the second layer of the slots 13 to the top portions and the inclined portions 21$f$' of the second coil end portions 21$f$ that protrude outward from the third layer of the slots 13 to the top portions are arranged at a pitch of one slot in a circumferential direction so as to be inclined in opposite directions to constitute a second coil end portion row. Thus, if the second coil end portion row is viewed from a radially outer side, a gap S' is formed between radially adjacent inclined portions 21$f$' of the second coil end portion row. The second insulating paper 152 is disposed inside the second coil end portion row such that the penetrating apertures 152$a$ overlap with the gap S' when viewed from the radially outer side. Moreover, the radially adjacent inclined portions 21$f$' of the second coil end portions 21$f$ correspond to radially adjacent conductor portions of portions of the conductor wires 19 that constitute the second coil ends 20$b$.

Although not shown, the inclined portions 21$f$' of the second coil end portions 21$f$ that protrude outward from the third layer of the slots 13 to the top portions and the inclined portions 21$j$' of the second coil terminals 21$j$ that protrude outward from the fourth layer of the slots 13 to the end portions are arranged at a pitch of one slot in a circumferential direction so as to be inclined in opposite directions. The first insulating paper 151 is disposed between radially adjacent inclined portions 21$f$' and 21$j$' of the second coil end portion row and the row of second coil terminals 21$j$. Moreover, the radially adjacent inclined portions 21$f$' and 21$j$' of the second coil end portion row and the row of second coil terminals 21$j$ correspond to radially adjacent conductor portions of portions of the conductor wires 19 that constitute the second coil ends 20$b$.

Next, the slot cells 14 are mounted onto each of the columns of first through fourth rectilinear portions 21$a$, 21$b$, 21$c$, and 21$d$, which are arranged in single columns radially. Next, the thirty core blocks 12 are arranged at a uniform angular pitch on an outer circumferential side of the armature winding 20 such that the teeth 12$b$ are positioned on a radially outer side between the columns of first through fourth rectilinear portions 21$a$, 21$b$, 21$c$, and 21$d$, as shown in FIG. 15.

Next, the thirty core blocks 12 that are arranged circumferentially are simultaneously moved radially inward. The teeth 12$b$ are inserted between the columns of first through fourth rectilinear portions 21$a$, 21$b$, 21$c$, and 21$d$ by this radially inward movement of the core blocks 12. Then, the radially inward movement of the core blocks 12 is prevented by the circumferential side surfaces of the core back portions 12$a$ of the adjacent core blocks 12 contacting each other.

As shown in FIG. 16, the core blocks 12 are thereby arranged into an annular shape by placing the circumferential side surfaces of the core back portions 12$a$ in contact with each other to constitute the armature core 11. The armature winding 20 is mounted to the armature core 11 such that the respective columns of first through fourth rectilinear portions 21$a$, 21$b$, 21$c$, and 21$d$ are housed inside the slots 13. Next, desired connection processes are applied to the first coil terminals 21$h$ and the second coil terminal 21$j$ to obtain the armature 10.

Figure 17:
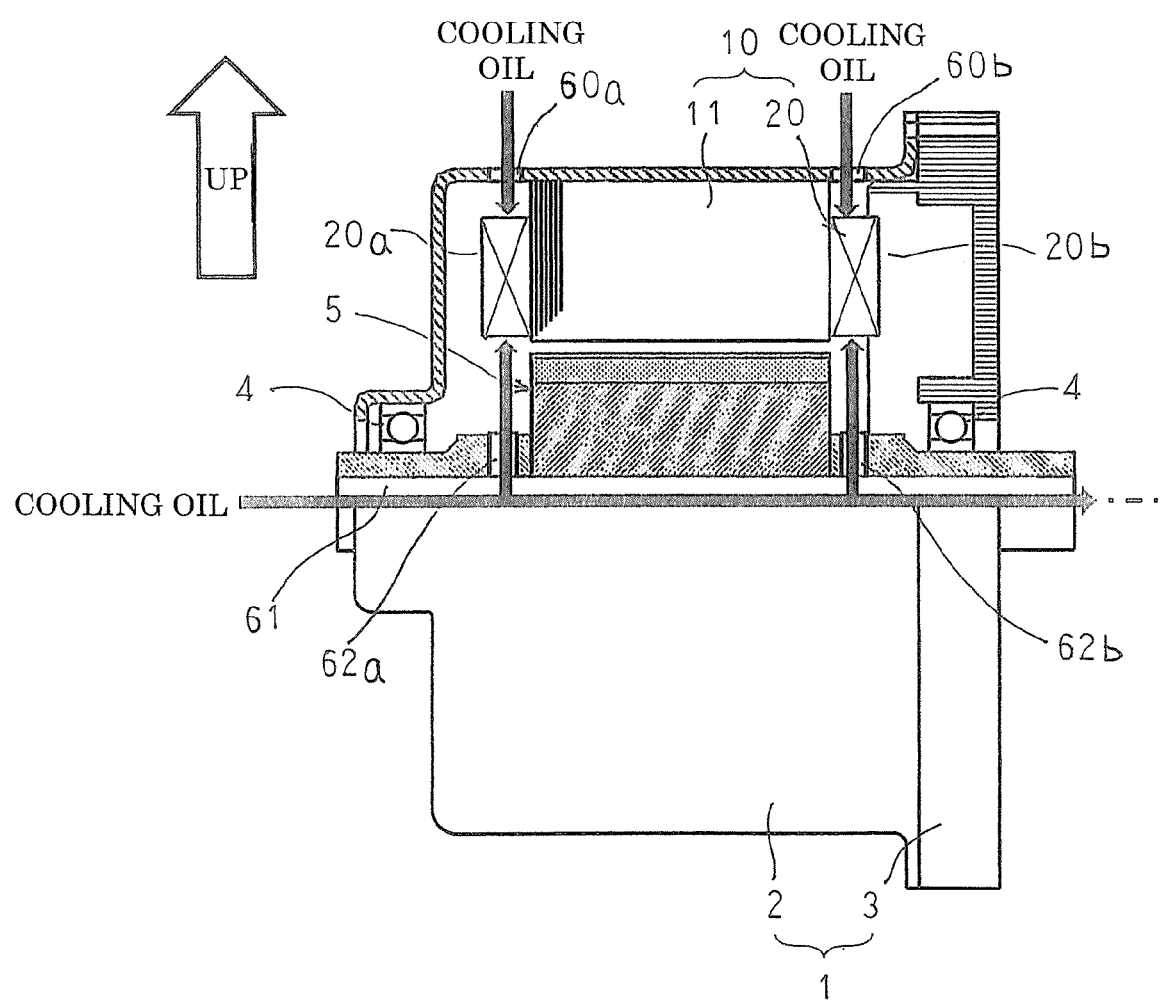
FIG. 17 is a half section that explains flow of a liquid coolant during a cooling operation in the rotary electric machine according to Embodiment 1 of the present invention.
Figure 18:
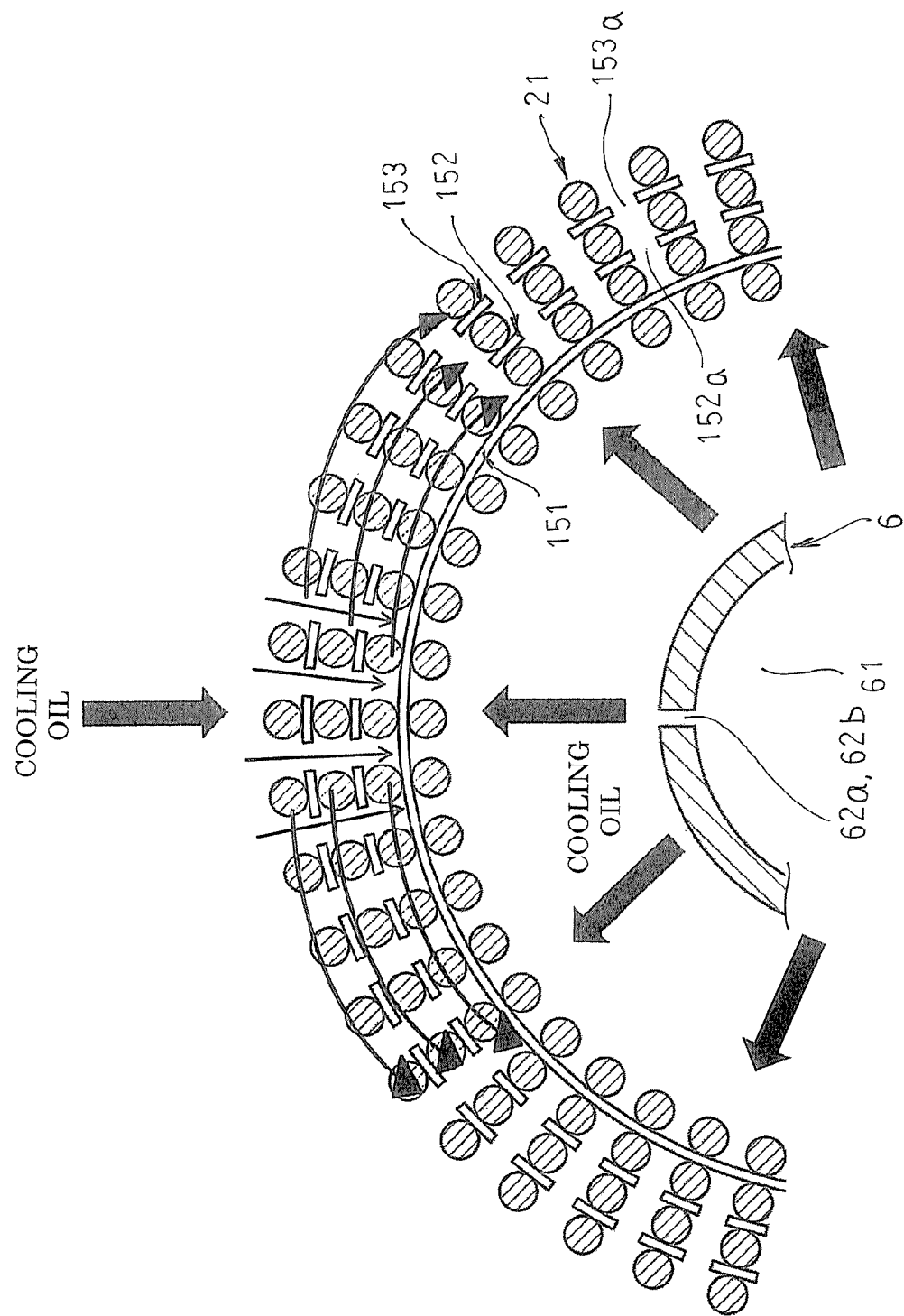
FIG. 18 is a schematic diagram that explains the flow of the liquid coolant during the cooling operation in the rotary electric machine according to Embodiment 1 of the present invention.

Next, cooling of the armature winding 20 during operation of the rotary electric machine 100 will be explained with reference to FIGS. 17 and 18. FIG. 17 is a half section that explains flow of a liquid coolant during a cooling operation in the rotary electric machine according to Embodiment 1 of the present invention, and FIG. 18 is a schematic diagram that explains the flow of the liquid coolant during the cooling operation in the rotary electric machine according to Embodiment 1 of the present invention. Moreover, arrows in FIGS. 17 and 18 represent flow of liquid coolant.

As shown in FIG. 17, the rotary electric machine 100 in which this armature 10 is installed is disposed such that a central axis of the rotating shaft 6 is horizontal, and such that the coolant suction apertures 60$a$ and 60$b$ that are formed on the frame 2 face upward. During operation of the rotary electric machine 100, a liquid coolant such as automatic transmission fluid (ATF) oil is conveyed under pressure to the coolant suction apertures 60a and 60b and the central bore 61 by an oil pump (not shown).

Because the coolant suction apertures 60a and 60b are positioned radially outside the first and second coil ends 20a and 20b of the armature winding 20, the liquid coolant is blown onto the first and second coil ends 20a and 20b from the coolant suction apertures 60a and 60b. As shown in FIG. 18, the liquid coolant that is blown onto the first and second coil ends 20a and 20b contacts the third insulating papers 153, and flows along the third insulating papers 153 in two circumferential directions. Then, a portion of the liquid coolant flows radially inward through the penetrating apertures 153a, and flows circumferentially along the second insulating papers 152. Then, a portion of the liquid coolant flows radially inward through the penetrating apertures 152a, and flows circumferentially along the first insulating papers 151. In this manner, the liquid coolant flows circumferentially through the first and second coil ends 20a and 20b while penetrating from a radially outer side to a radially inner side, and accumulates vertically below inside the frame 2. Moreover, because penetrating apertures are not formed on the first insulating papers 151, the liquid coolant does not flow out to a radially inner side from the first and second coil ends 20a and 20b.

The liquid coolant that is conveyed under pressure to the central bore 61 is sprayed from the nozzles 62a and 62b due to centrifugal forces, and is blown onto radially inner sides of the first and second coil ends 20a and 20b. The liquid coolant that is blown onto the radially inner sides of the first and second coil ends 20a and 20b flows circumferentially along the first and second coil ends 20a and 20b, drips due to gravitational force, and accumulates vertically below inside the frame 2. The liquid coolant that has accumulated vertically below inside the frame 2 is conveyed under pressure to the coolant suction apertures 60a and 60b and the central bore 61 by the oil pump, and serves to cool the first and second coil ends 20a and 20b.

According to Embodiment 1, strip-shaped first through third insulating papers 151, 152, and 153 are disposed circumferentially on portions of conductor wires 19 that constitute first and second coil ends 20a and 20b by being inserted between radially adjacent inclined portions 21e', 21f, 21g', 21j', and 21j'. Penetrating apertures 152a and 153a are formed on the second and third insulating papers 152 and 153 but not on the first insulating papers 151, which are positioned radially innermost. Coolant suction apertures 60a and 60b are formed singly on a cylindrical portion of the frame 2 such that each is positioned radially outside the first and second coil ends 20a and 20b respectively. A rotary electric machine 100 is installed such that a central axis of a rotating shaft 6 is horizontal, and such that the coolant suction apertures 60a and 60b face upward.

Thus, liquid coolant that is blown from the coolant suction apertures 60a and 60b onto the first and second coil ends 20a and 20b flows circumferentially due to the first through third insulating papers 151, 152, and 153 while penetrating radially inside the first and second coil ends 20a and 20b due to the penetrating apertures 152a and 153a. Because the liquid coolant is thereby spread out evenly radially and circumferentially inside the first and second coil ends 20a and 20b, the occurrence of uneven cooling of the first and second coil ends 20a and 20b is suppressed, enabling the armature winding 20 to be cooled effectively.

Only one of each of the coolant suction apertures 60a and 60b that are formed radially outside the first and second coil ends 20a and 20b is sufficient, enabling the cooling construction of the armature winding 20 to be simplified.

Because penetrating apertures are not formed on the first insulating papers 151 that are positioned radially innermost, the liquid coolant is less likely to flow out from the first and second coil ends 20a and 20b on a radially inner side. Thus, worsening of loss that results from the liquid coolant flowing into an air gap between a rotor 5 and the armature 10 can be prevented.

Because the penetrating apertures 152a and 153a overlap with the gaps S' that are formed on portions of conductor wires 19 that constitute first and second coil ends 20a and 20b between radially adjacent inclined portions 21e', 21f, 21g', and 21h', the liquid coolant is more likely to flow radially inward through the first and second coil ends 20a and 20b, enabling cooling performance of the armature winding 20 to be improved.

Nozzles 62a and 62b are formed so as to branch off radially from the central bore 61 that is at a central axial position of a rotating shaft 6 and extend to an outer circumferential surface of the rotating shaft 6 at positions that are radially inside the first and second coil ends 20a and 20b. Thus, because the liquid coolant is sprayed from the nozzles 62a and 62b, and is blown onto the first and second coil ends 20a and 20b from a radially inner side, if the liquid coolant is supplied to the central bore 61 during operation of the rotary electric machine 100, cooling performance of the armature winding 20 can be further improved.

Moreover, in Embodiment 1 above, the strip-shaped insulating papers are curled into annular shapes and are mounted so as to extend around an entire circumferential region inside the first and second coil ends, but it is not necessary for the insulating papers to extend around the entire circumferential region inside the first and second coil ends provided that they are positioned at positions directly below the coolant suction apertures that are formed on the cylindrical portion of the frame, and they may be curled into C shapes, for example, and mounted inside the first and second coil ends.

In Embodiment 1 above, circular penetrating apertures are formed on the second and third insulating papers, but the aperture shape of the penetrating apertures that are formed on the second and third insulating papers is not limited to a circular shape, provided that the aperture shape allows the liquid coolant to pass through the second and third insulating papers, and may be a quadrangular or elliptical aperture shape, for example.

In Embodiment 1 above, insulating papers on which penetrating apertures are not formed are used as the first insulating papers, but insulating papers on which penetrating apertures are formed may be used for the first insulating papers.

In Embodiment 1 above, the first through third insulating papers are disposed on the first and second coil ends, but the number of layers of insulating papers that are disposed radially on the first and second coil ends is not limited to three layers, and may be a single layer, or two layers. If the number of layers of insulating papers is a single layer, for example, any one insulating paper of the first through third insulating papers should be disposed. If the number of layers of insulating papers is two layers, two insulating papers that are selected from among the first through third insulating papers should be disposed.

In Embodiment 1 above, the coils are produced by winding the conductor wire into a δ-shaped coil pattern for one turn, but the coils may be coils that are produced by winding the conductor wire into a δ-shaped coil pattern for two or more turns. The coils are produced by winding the conductor wire for one turn into a δ-shaped coil pattern, but the coils may be "hexagonal" coils that are produced by winding the conductor wire helically, or may be U-shaped coils in which two rectilinear portions are linked by coil end portions.

In Embodiment 1 above, coil end portions link together end portions of rectilinear portions that are inserted into slots that are separated by an angular pitch of six slots, but spacing between the slots into which the two rectilinear portions that are linked by the coil end portions are inserted is not limited to an angular pitch of six slots, and need only be greater than or equal to an angular pitch of two slots.

In Embodiment 1 above, the first coil end portion row and the third coil end portion row are arranged in two layers in a radial direction, but the first coil end portion row and the third coil end portion row may be arranged in two layers axially. In other words, the first coil end portion row may be arranged so as to be positioned outside the third coil end portion row. For example, if four rectilinear portions are inserted inside the slots so as to line up in a single column in a radial direction, then a configuration in which the first coil end portion row and the third coil end portion row are arranged in two layers axially can be achieved by first coil end portions linking together end portions of rectilinear portions that are positioned in the first layer and the fourth layer, and third coil end portions linking together end portions of rectilinear portions that are positioned in the second layer and the third layer. Thus, insulating papers are inserted between inclined portions of the first coil end portions that protrude outward from the first layer of the slots and inclined portions of the third coil end portions that protrude outward from the second layer of the slots, between inclined portions of the third coil end portion row that protrude outward from the second layer and the third layer of the slots, and between inclined portions of the third coil end portions that protrude outward from the third layer of the slots and inclined portions of the first coil end portions that protrude outward from the fourth layer of the slots, respectively.

What is claimed is:

1. A rotary electric machine comprising:
   a housing;
   a rotor that is fixed to a rotating shaft that is rotatably supported by said housing so as to be disposed inside said housing;
   an armature including:
   an annular armature core in which slots are arranged circumferentially so as to open radially inward; and
   an armature winding that is constituted by a plurality of coils that are each produced by bending and shaping a conductor wire, and that are mounted to said armature core,
   said armature being disposed so as to be coaxial to said rotor so as to surround said rotor, and being held by said housing,
   said rotary electric machine being installed such that a central axis of said rotating shaft is horizontal, and a liquid coolant being blown onto a coil end of said armature winding from a coolant suction aperture that is formed on said housing to cool said armature winding,
   wherein:
   said coolant suction aperture is formed at a position on said housing that is vertically above said coil end; and
   a strip-shaped insulating paper is inserted such that a thickness direction is in a radial direction between radially adjacent conductor portions of a portion of said conductor wire that constitutes said coil end, and is disposed so as to extend circumferentially across a position that is vertically below said coolant suction aperture inside said coil end, wherein:
   m layers of said insulating paper that is inserted between said radially adjacent conductor portions are disposed in a radial direction, where m is an integer that is greater than or equal to 1; and
   a penetrating aperture that allows said liquid coolant to pass through is formed on each of said m layers of insulating paper that are disposed in said radial direction,
   wherein said penetrating aperture is formed on said insulating paper so as to overlap when viewed from a radially outer side of said coil end with a gap that is formed between said conductor portions that are on opposite sides of said insulating paper.

2. The rotary electric machine according to claim 1, wherein a central bore is formed at a central axial position of said rotating shaft, a nozzle is formed so as to branch off radially from said central bore at a position of said coil end on said rotating shaft, and said liquid coolant is supplied to said central bore during operation, and is blown onto said coil end from said nozzle.

3. A rotary electric machine comprising:
   a housing;
   a rotor that is fixed to a rotating shaft that is rotatably supported by said housing so as to be disposed inside said housing;
   an armature including:
   an annular armature core in which slots are arranged circumferentially so as to open radially inward; and
   an armature winding that is constituted by a plurality of coils that are each produced by bending and shaping a conductor wire, and that are mounted to said armature core,
   said armature being disposed so as to be coaxial to said rotor so as to surround said rotor, and being held by said housing,
   said rotary electric machine being installed such that a central axis of said rotating shaft is horizontal, and a liquid coolant being blown onto a coil end of said armature winding from a coolant suction aperture that is formed on said housing to cool said armature winding,
   wherein:
   said coolant suction aperture is formed at a position on said housing that is vertically above said coil end; and
   a strip-shaped insulating paper is inserted such that a thickness direction is in a radial direction between radially adjacent conductor portions of a portion of said conductor wire that constitutes said coil end, and is disposed so as to extend circumferentially across a position that is vertically below said coolant suction aperture inside said coil end, wherein:
   m layers of said insulating paper that is inserted between said radially adjacent conductor portions are disposed in a radial direction, where m is an integer that is greater than or equal to 2; and
   a penetrating aperture that allows said liquid coolant to pass through is formed on each of said insulating papers except for said insulating paper that is positioned radially innermost.

4. The rotary electric machine according to claim 3, wherein said penetrating aperture is formed on said insulating paper so as to overlap when viewed from a radially outer side of said coil end with a gap that is formed between said conductor portions that are on opposite sides of said insulating paper.

* * * * *